(12) United States Patent
Nojima (10) Patent No.: US 7,761,029 B2
(45) Date of Patent: Jul. 20, 2010

(54) IMAGE FORMING APPARATUS

(75) Inventor: Koji Nojima, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 951 days.

(21) Appl. No.: 11/530,540

(22) Filed: Sep. 11, 2006

(65) Prior Publication Data

US 2007/0070430 A1 Mar. 29, 2007

(30) Foreign Application Priority Data

Sep. 12, 2005 (JP) .............................. 2005-263265

(51) Int. Cl.
*G03G 15/00* (2006.01)
(52) U.S. Cl. ...................... 399/107; 399/110
(58) Field of Classification Search ...................... 399/1, 399/107, 108, 110
See application file for complete search history.

(56) References Cited

U.S. PATENT DOCUMENTS 5,963,770 A * 10/1999 Eakin .......................... 399/364
6,968,140 B2 11/2005 Asai

FOREIGN PATENT DOCUMENTS

JP 2004-184982 7/2004

* cited by examiner

*Primary Examiner*—Hoang Ngo
(74) *Attorney, Agent, or Firm*—Fitzpatrick, Cella, Harper & Scinto

(57) ABSTRACT

An image forming apparatus comprises a plurality of modules, a supporting means which supports a plurality of modules, and a control means which is provided on the supporting means and which controls the plurality of the modules. The supporting means is constituted by joining a plurality of base units with each other.

9 Claims, 12 Drawing Sheets

IMAGE FORMING APPARATUS

BACKGROUND OF THE INVENTION

1. Field of the Invention

The present invention relates to an image forming apparatus having a plurality of modules.

2. Description of the Related Art

Conventionally, as an image forming apparatus having a plurality of modules, an image forming apparatus having a reader for reading an image on an original and a printer for recording an image on a sheet has been well known. Particularly, there has been known a digital signal type image forming apparatus in which image information on the original, read with the reader, is converted to electric signals and communicated to a printer, where a corresponding image is recorded on a sheet based on the electric signals.

Figure 11:
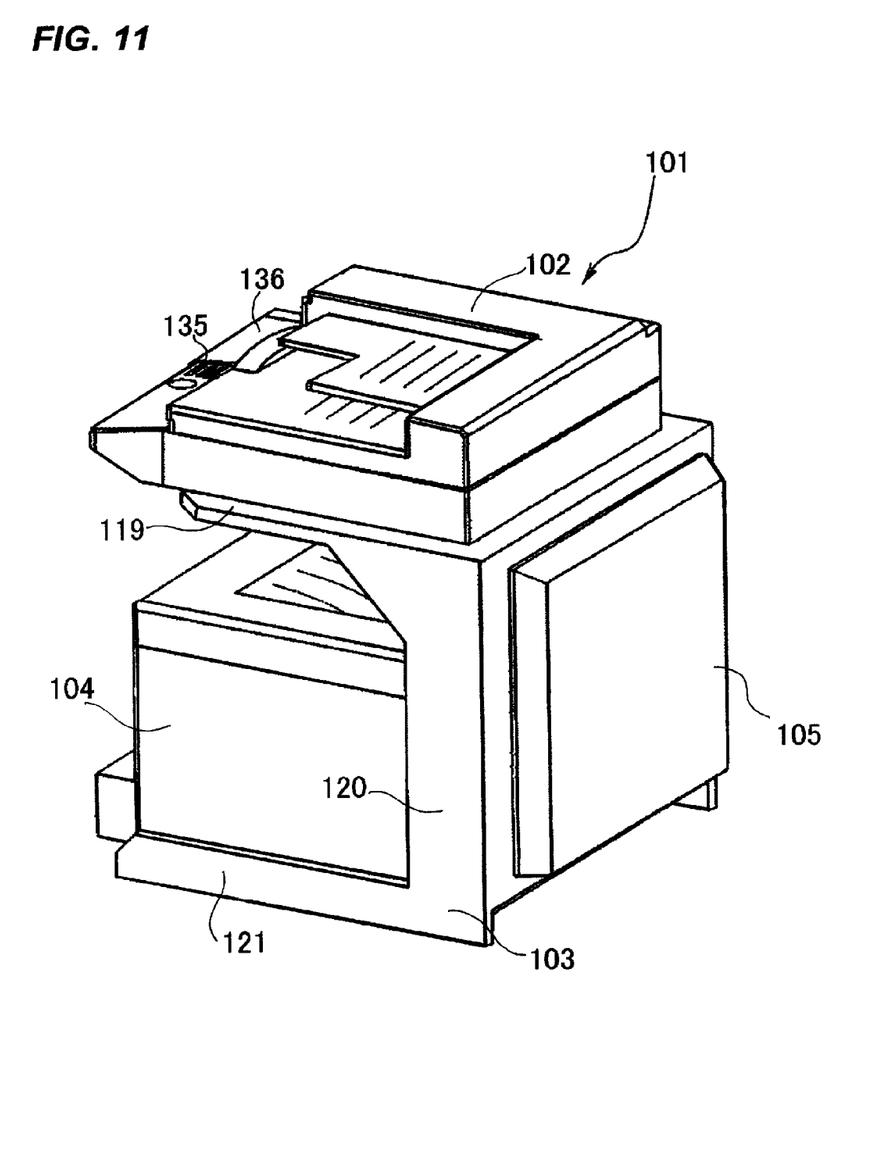
FIG. 11 is a perspective view showing the structure of the image forming apparatus of a conventional example.

More specifically, an image forming apparatus 101, as shown in FIG. 11, has been proposed (see Japanese Patent Application Laid-Open No.2004-184982). An image forming apparatus 101 shown in FIG. 11 includes a supporting base 103, which supports a scanner unit 102 and a printer unit 104. This supporting base 103 is composed of a supporting portion 119 formed in a flat form, two supporting side portions 120 fixed on two corners of four corners of the supporting portion 119 such that they are directed downward, and supporting leg portions 121 extending substantially horizontally from the bottom end portions of the supporting side portions 120. As shown in FIG. 11, in the image forming apparatus 101, a scanner unit 102 is provided on the top face of the supporting base 103 and a printer unit 104 is provided inside the supporting base 103. Further, a control unit 105 is installed on the outer side face of the supporting base 103 and image information is converted to electric signals by the scanner unit 102 and transported to the control unit 105, and a corresponding image is recorded by the printer unit 104 based on image information received by the control unit 105.

Figure 12:
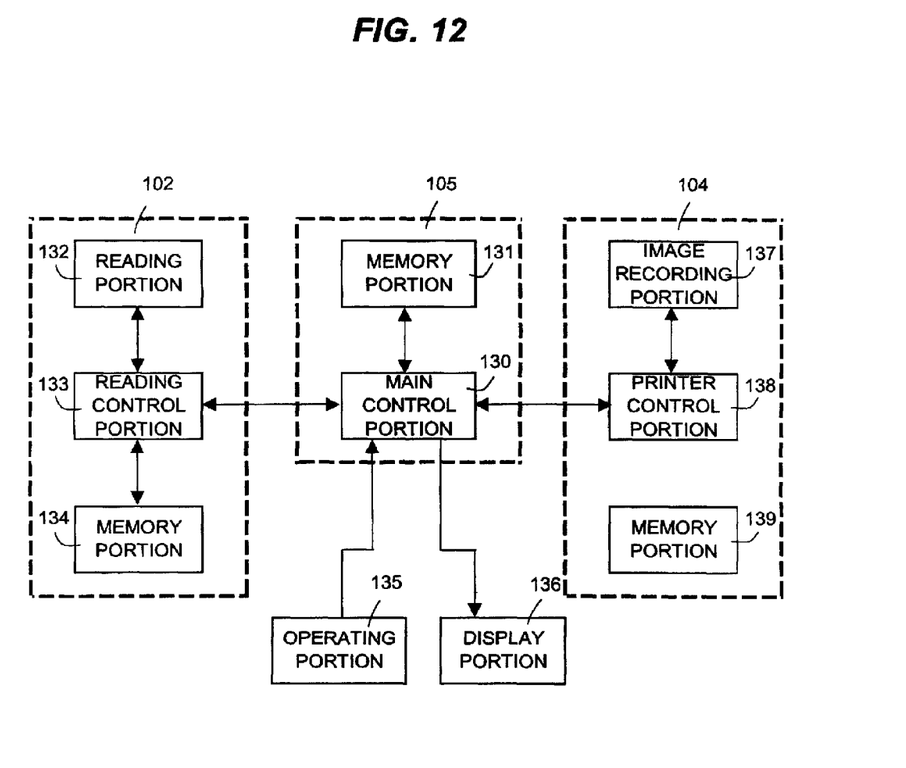
FIG. 12 is a block diagram showing the configuration of the control system of the image forming apparatus of the conventional example.

A control board (not shown) is fixed inside the control unit 105. This control board is composed of a main control portion 130 and a memory portion 131 as shown in a block diagram of the entire apparatus of FIG. 12. The main control portion 130 reads out a program and the like memorized in a memory portion 131 corresponding to an instruction signal inputted from an operating portion 135 and sends a control signal to a reading control portion 133 of the scanner unit 102. A signal read by a reading portion 132 of the scanner unit 102 is processed by the reading control portion 133 and inputted to the main control portion 130. A memory portion 134 is connected to the reading control portion 133, in which a program and the like necessary for read processing are memorized. Processing information and error information are transmitted from the main control portion 130 to a display portion 136 as required and displayed thereon. A read signal from the reading control portion 133 is processed by the main control portion 133 and sent to the printer control portion 138 of the printer unit 104. The printer control portion 138 reads out information necessary for a record memorized in the memory portion 139 and controls an image recording portion 137 so as to record an image on a sheet. Then, information about printer processing is transmitted from the printer control portion 138 to the main control portion 130.

With such a structure, the function of the image forming apparatus can be changed by changing a control board inside the control unit 105 corresponding to the structure of the apparatus to exchange the module corresponding to customer needs (see Japanese Patent Application Laid-Open No. 2004-184982).

However, in the above-described conventional structure, variation of exchanging of the module is limited because the size and form of the supporting base 103 cannot be changed, thereby making it difficult to meet customer needs delicately.

Further, the quantity of the control boards may be reduced depending on a combination of the modules because the size of the control unit 105 which fixes the control boards is constant and in this case, the internal space of the control unit is wasted. On the other hand, additional installation of the control boards is limited to the internal space within the control unit 105.

Accordingly, a first object of the present invention is to provide an image forming apparatus, which allows variation of the configuration thereof to increase so as to meet customer needs delicately.

A second object of the present invention is to provide an image forming apparatus capable of securing an accommodation space of a control board for controlling the module without excess or shortage even if the quantity of the modules which constitute the apparatus is increased or decreased.

SUMMARY OF THE INVENTION

The image forming apparatus of the present invention comprises: a plurality of modules which includes a module for forming an image; a supporting means which supports the plurality of the modules; and a control means which controls the plurality of the modules, wherein the supporting means is constituted by joining the plurality of the base units each having substantially same structure and each base unit includes a supporting portion which supports the module and an accommodating portion which accommodates the control means.

Further, the image forming apparatus of the present invention for achieving the first object comprises: a plurality of modules; a supporting means which supports the plurality of the modules; and a control means which is provided on the supporting means and controls the plurality of the modules, wherein the supporting means is constituted by joining a plurality of base units to each other.

The supporting unit for the image forming apparatus of the present invention comprises: a first base unit including an accommodating portion which accommodates a control portion for controlling the image forming module; a second base unit in which an end portion thereof is joined to the first base unit; and a third base unit which includes an accommodating portion which accommodates a control portion for controlling the image forming module and is connected to other end portion of the second base unit, wherein the first base unit and the second base unit are separable from each other, the second base unit and the third base unit are separable from each other while the first base unit and the third base unit are capable of being joined together.

DESCRIPTION OF THE EMBODIMENTS

Figure 1:
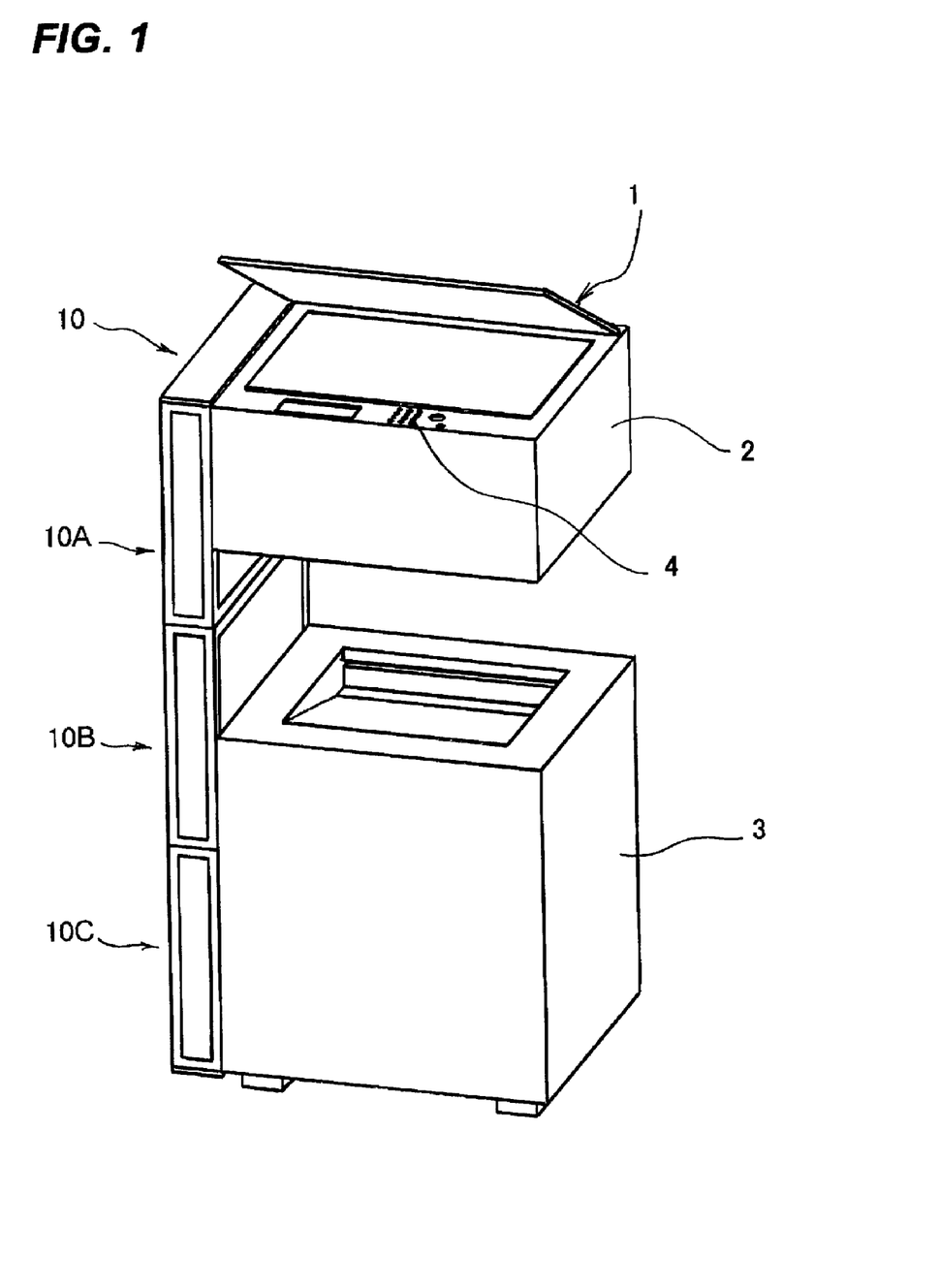
FIG. 1 is a perspective view showing an example of the structure of an image forming apparatus of the present embodiment.
Figure 2:
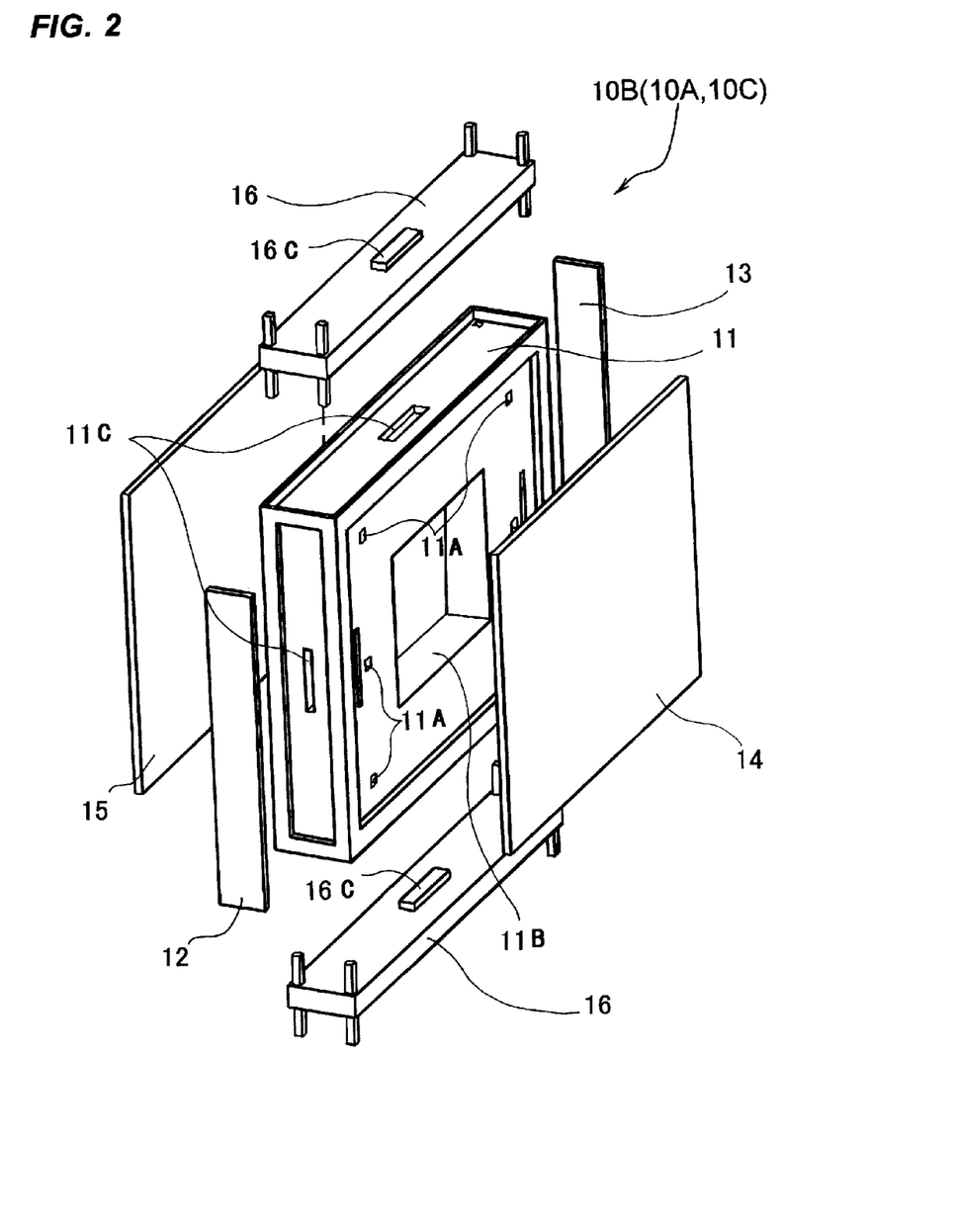
FIG. 2 is a development view of a base unit which supports a module.
Figure 3:
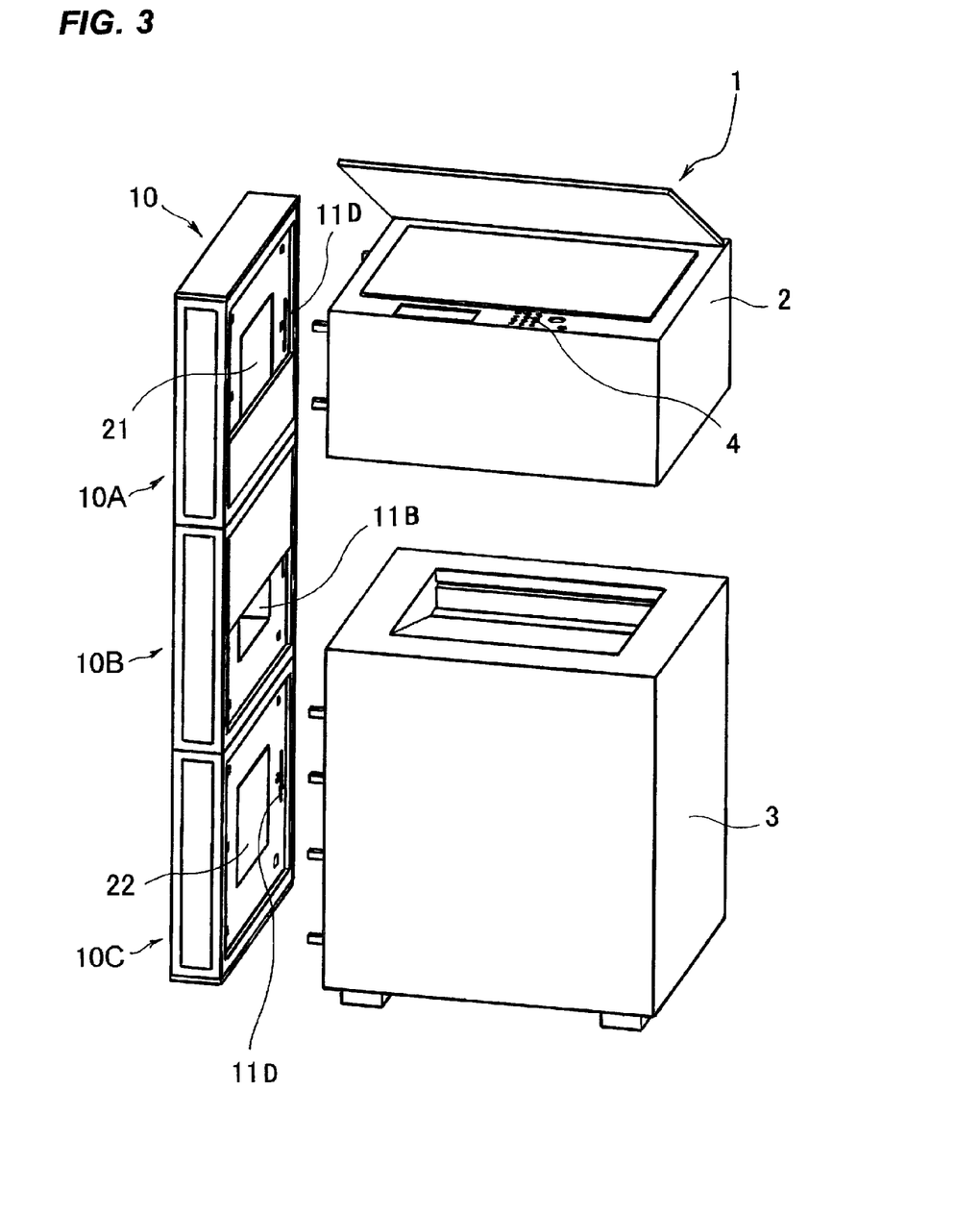
FIG. 3 is a perspective view showing a connection between a supporting body composed of a plurality of base units and a plurality of modules.
Figure 4:
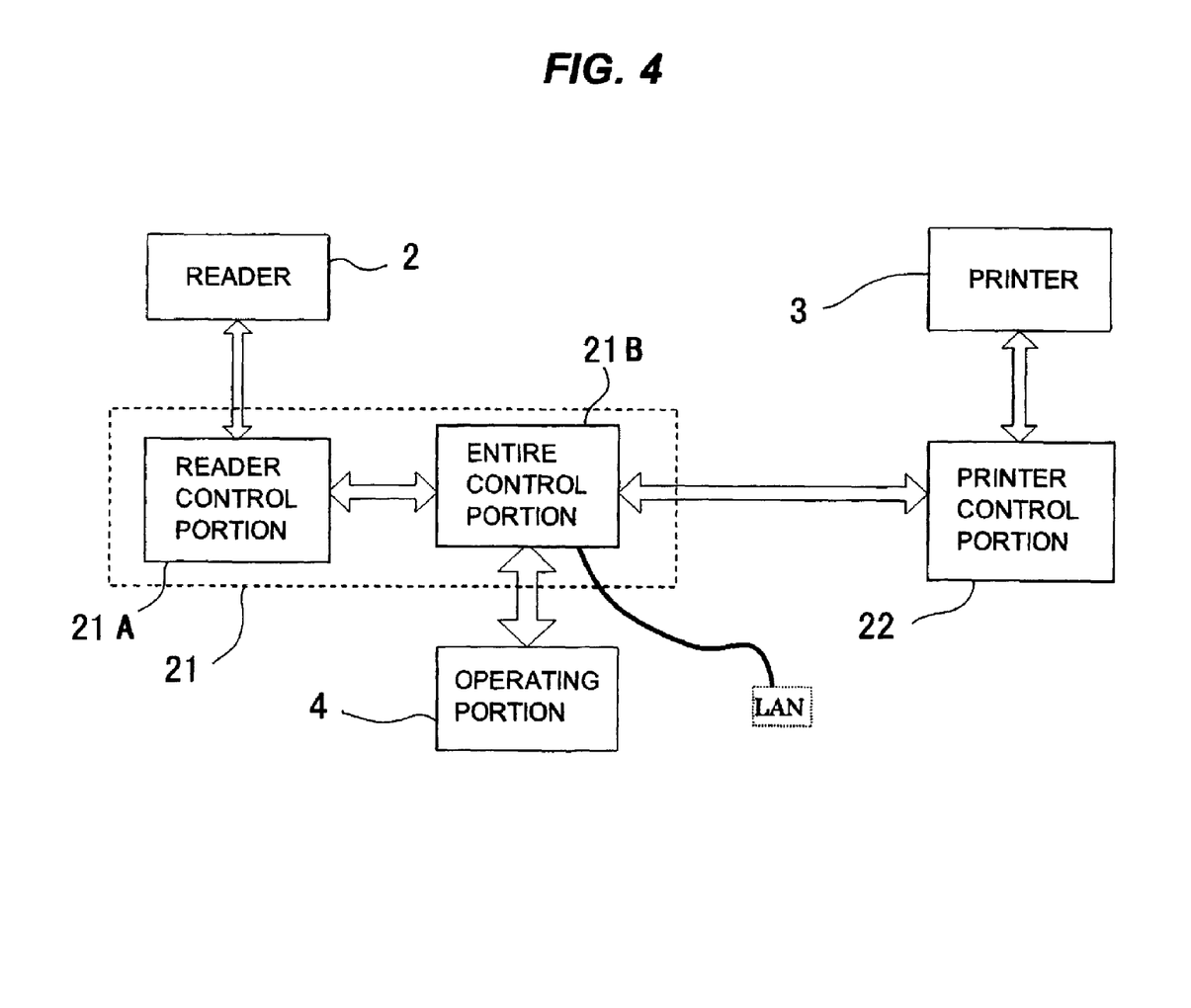
FIG. 4 is a block diagram showing the configuration of the control system of the image forming apparatus shown in FIG. 1.
Figure 8:
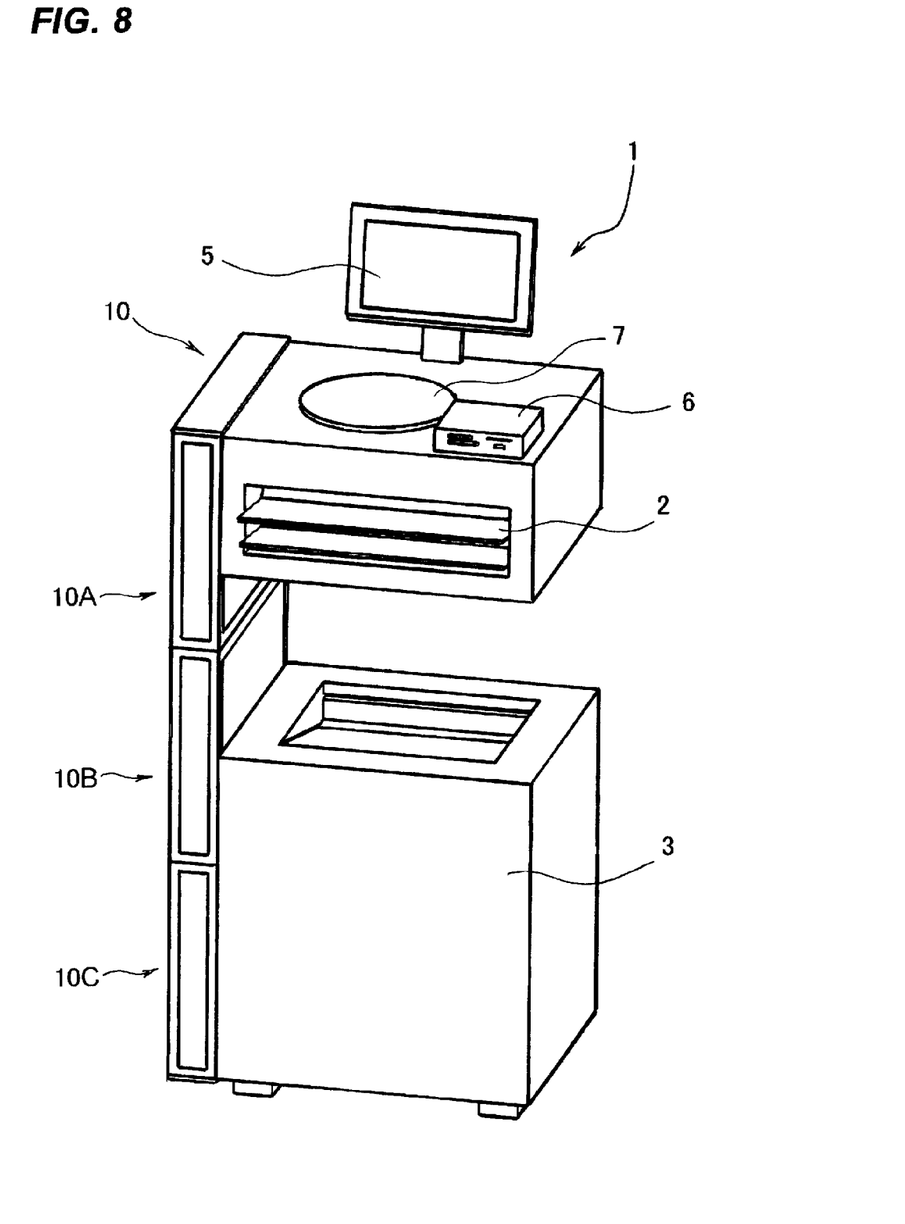
FIG. 8 is a perspective view showing another example of the structure of the image forming apparatus of the present embodiment.
Figure 9:
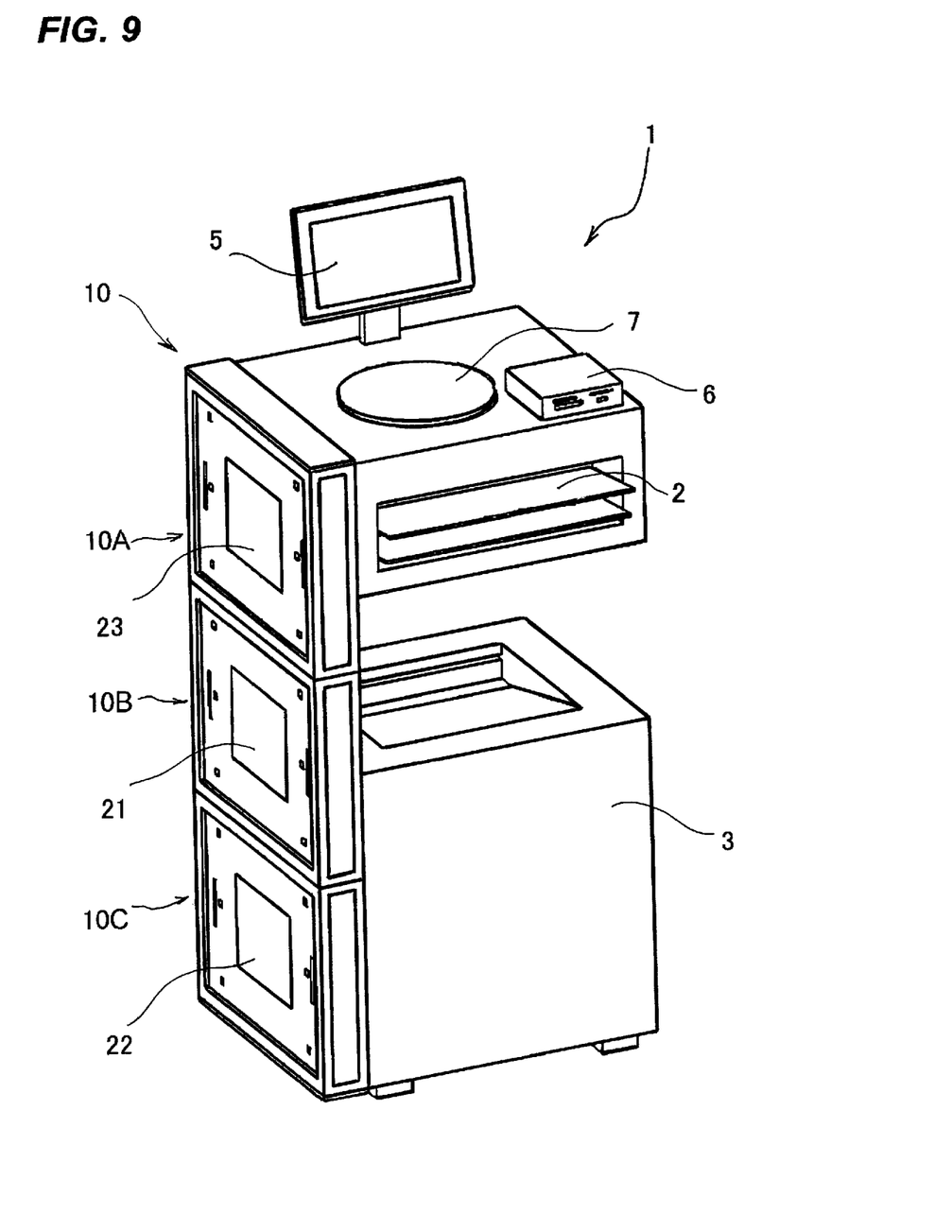
FIG. 9 is a perspective view showing another example of the structure of the image forming apparatus of the present embodiment.
Figure 10:
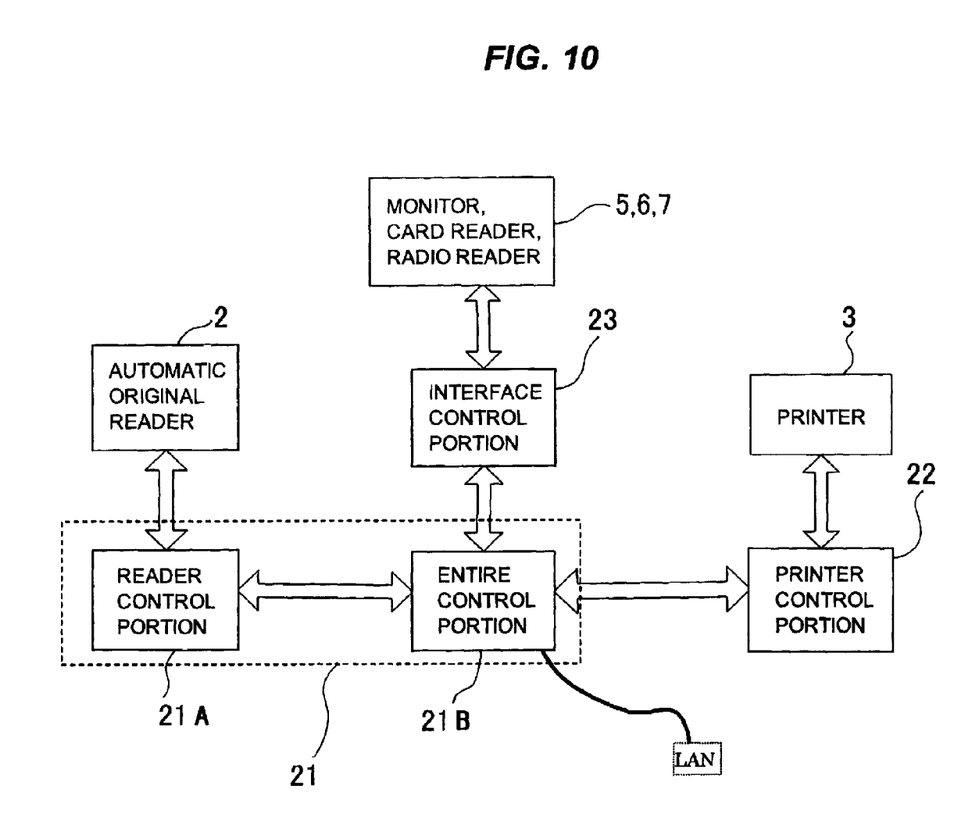
FIG. 10 is a block diagram showing the configuration of the control system of the image forming apparatus shown in FIG. 8.

Hereinafter the preferred embodiments of the present invention will be described in detail with reference to the accompanying drawings. FIG. 1 is a perspective view showing an example of the structure of an image forming apparatus of the present embodiment. FIG. 1 exemplifies a small image forming apparatus capable of outputting an A4 size sheet. FIG. 2 is a development view of a base unit which supports a module. FIG. 3 is a perspective view showing a connection between a supporting body composed of a plurality of base units and a plurality of modules. FIG. 4 is a block diagram showing the configuration of the control system of the image forming apparatus shown in FIG. 1. FIGS. 5, 6, 8, and 9 are a perspective views showing other examples of the structure of the image forming apparatus of the present embodiment. FIG. 7 is a block diagram showing the configuration of the control system of the image forming apparatus shown in FIG. 6. FIG. 10 is a block diagram showing the configuration of the control system of the image forming apparatus shown in FIG. 8. As shown in FIG. 1, the image forming apparatus 1 of the present embodiment includes a plurality of modules and a supporting body 10 as a supporting means for supporting the plurality of the modules. As the plurality of the modules, this drawing exemplifies a reader 2 as a reading unit for reading an image on an original and a printer 3 as a recording unit for recording an image on a sheet. The supporting body 10 is constituted by joining plural base units 10A, 10B, and 10C, each having a substantially same structure. In the meantime, the structure of each of the base units 10A, 10B, and 10C, which constitute this supporting body 10, will be described later. An operating portion 4, in which operation buttons for setting the quantity of sheets and display panel are arranged, is disposed on the front side of the reader 2. This image forming apparatus 1 can be used as a copying machine if user operates the operating portion 4 with an original set on the reader 2 and as a printer terminal if a user connects it to Local Area Network ("LAN").

In the image forming apparatus of the present embodiment, as described above, the plural modules 2 and 3 are supported by the supporting body 10 constituted by joining the base units 10A, 10B, and 10C, each having substantially same structure. The structure of the base unit will be described in detail. The base unit 10B will be exemplified here because the base units have substantially same structure. As shown in FIG. 2, the base unit 10B has a frame body 11, front cover 12, rear cover 13, right cover 14, and left cover 15. The frame body 11 has a supporting portion 11A for supporting the modules 2 and 3 and an accommodating portion 11B for accommodating a control means for controlling the modules 2 and 3. The base unit 10B is so constructed to be capable of being connected to a joint (connecting means) 16 for connecting the base units. The strength and stiffness of the connecting portion between the base units are secured by connecting the base units with the joint 16.

The joint 16 has a connector 16C as a connecting portion, which is joined to a connector 11C as a connecting portion provided in the base unit 10B. That is, the joint 16 takes a role of connecting the base units (control means accommodated in the accommodating portion) through the connectors 16C and 11C such that the base units are capable of communicating with each other.

In the image forming apparatus of the present embodiment, the control means for controlling the plural modules includes a printer control portion 22 for controlling the printer 3 and a main control portion 21 which integrates a reader control portion 21A for controlling the reader 2 and an entire control portion 21B as shown in FIG. 4. Of the base units which constitute the supporting body 10, the printer control portion 22 is accommodated in the base unit 10C to which the printer 3 is connected and the main control portion 21 is accommodated in the base unit 10A to which the reader 2 is connected. That is, the printer control portion 22 is accommodated in the base unit 10C which supports the printer 3 as a control object. Likewise, the main control portion 21 is accommodated in the base unit 10A which supports the reader 2 as a control object. By disposing the control portion and the control object module in the vicinity of each other, a communication path for connecting the control portion with the control object module becomes unlikely to be affected by noise.

FIG. 3 shows a condition of connecting plural base units 10A, 10B, and 10C with respective modules 2 and 3. Like connecting the base units with each other with the aforementioned joint 16, the base unit 10C and the printer 3, and the base unit 10A and the reader 2 are connected so as to be fitted. At the same time, the printer control portion 22 and the printer 3 are connected through a connector 11D of the base unit 10C such that they are capable of communicating with each other and the main control portion 21 and the reader 2 are connected through a connector 10D of the base unit 10A such that they are capable of communicating with each other. In the meantime, the base unit 10B does not accommodate any control portion but connects the base units 10A and 10C and at the same time, connects the main control portion 21 in the base unit 10A with the printer control portion 22 in the base unit 10C through a connector such that they are capable of communicating with each other. The base unit 10B takes a role of adjusting the height of the supporting body 10 to secure a sheet discharge space on the top of the printer 3.

FIG. 4 is a block diagram showing the structure of the image forming apparatus shown in FIG. 1. The reader control portion 21A in the main control portion 21 to which the reader 2 is connected and the printer control portion 22 to which the printer 3 is connected are connected to the operating portion 4 through the entire control portion 21B in the main control portion 21, so that the entire image forming apparatus 1 is controlled by the entire control portion 21B. The entire control portion 21B receives an input from the operating portion 4 or an output instruction from LAN to output a sheet to the printer 3.

The variation of the apparatus structure is not limited to the image forming apparatus shown in FIG. 1.

Figure 5:
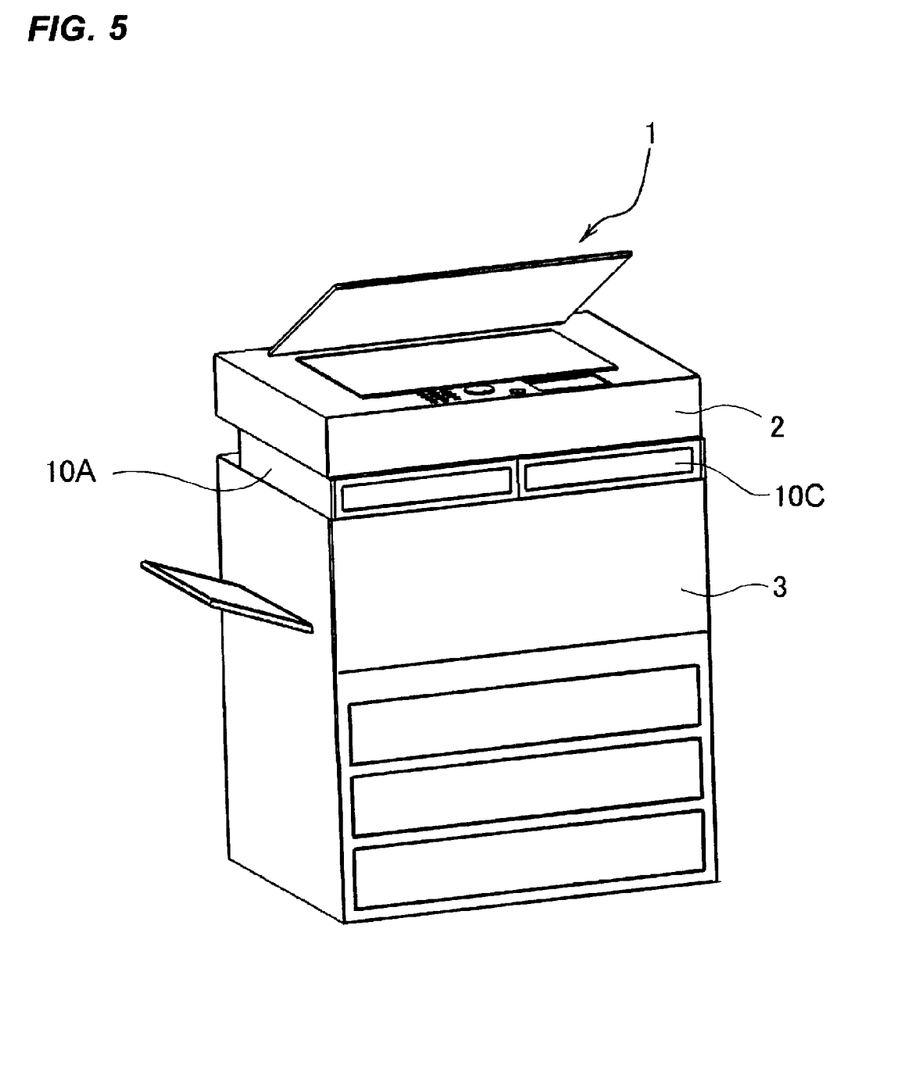
FIG. 5 is a perspective view showing another example of the structure of the image forming apparatus of the present embodiment.

FIG. 5 shows an example of the image forming apparatus 1 in which the large size printer 3 capable of outputting an A3 size sheet and the large size reader 2 capable of inputting an original of A3 size are combined. In this case, the two base units 10A and 10C are connected side by side so as to constitute the supporting body 10 and this supporting body 10 is disposed between the large size printer 3 and the large size reader 2. In the meantime, the two base units 10A and 10C which constitute the supporting body 10, each have the same structure as described above. The base unit 10A accommodates the main control portion 21 which integrates the reader control portion 21A and the entire control portion 21B and the base unit 10C accommodates the printer control portion 22. The reader 2 is connected to the top side of the base units 10A and 10C which constitutes the supporting body 10 and the printer 3 is connected to the bottom side of the base units 10A and 10C. The control structure of the image forming apparatus shown in FIG. 5 has the same structure as the one shown in FIG. 4.

Figure 6:
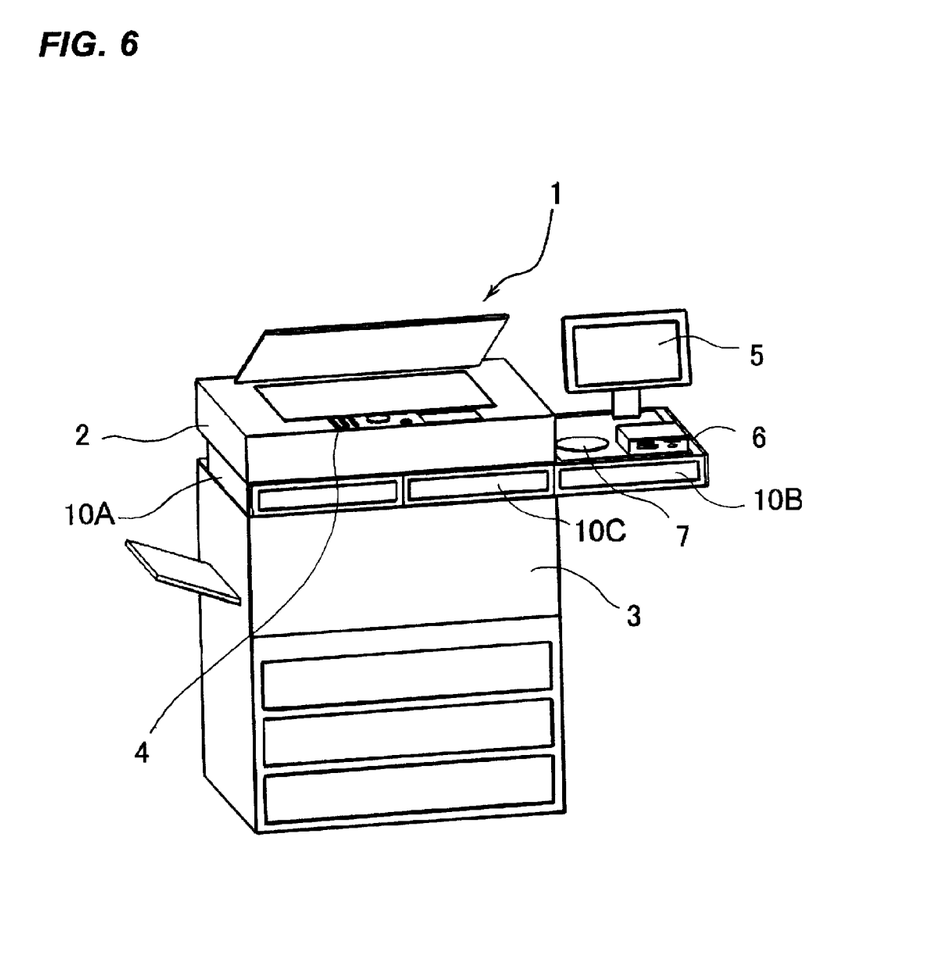
FIG. 6 is a perspective view showing another example of the structure of the image forming apparatus of the present embodiment.
Figure 7:
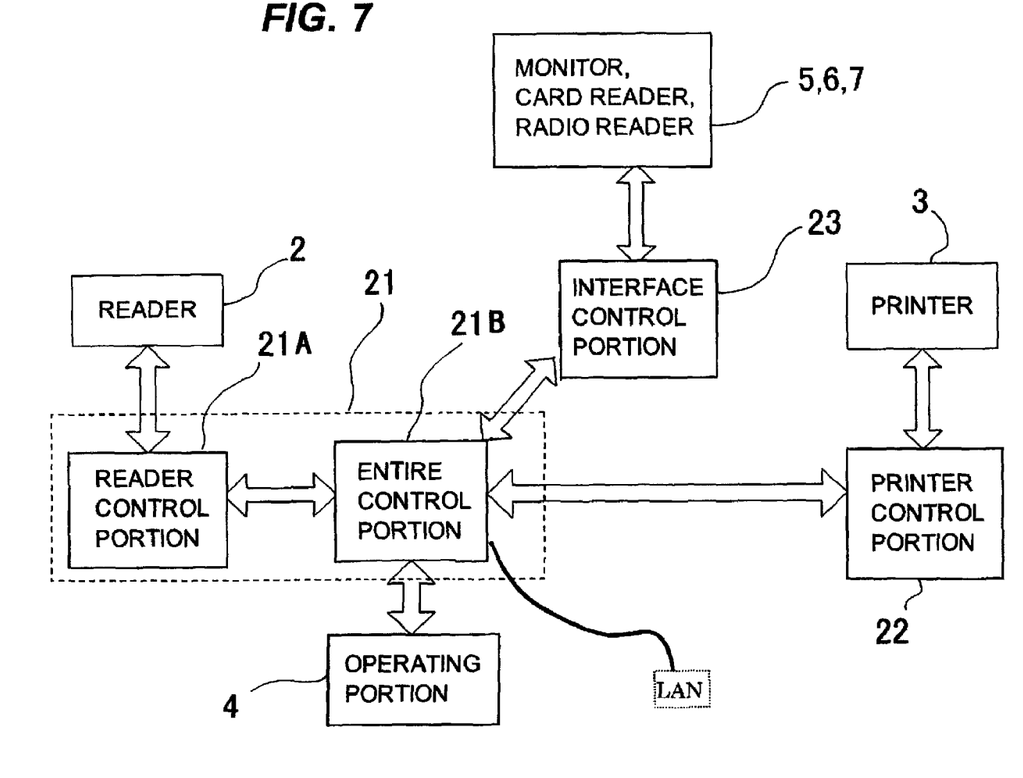
FIG. 7 is a block diagram showing the configuration of the control system of the image forming apparatus shown in FIG. 6.

FIG. 6 shows a structure of the structure shown in FIG. 5 equipped with an additional module. In the image forming apparatus shown in FIG. 6, the base unit 10B is connected to the structure shown in FIG. 5 side by side and an interface unit such as a touch panel 5, a card reader 6, and/or radio IC card reader 7 is provided on this base unit 10B. The touch panel 5 raises the operability of the apparatus with graphical user interface) ("GUI") securing a wide display area. The card reader 6 is capable of reading image data from a memory card of digital camera. The radio IC card reader 7 takes a role of providing user authorization function. In the image forming apparatus shown in FIG. 6, the interface control portion 23 for controlling the interface unit can be accommodated in the added base unit 10B. According to this structure, any additional accommodation space does not need to be secured preliminarily in the accommodating portion of the control portion unlike the conventional example, because the quantity of the base units increase with addition of a module so that the accommodating space of the control portion also increases.

FIG. 7 is a block diagram showing the control structure of the image forming apparatus shown in FIG. 6. In addition to the control structure shown in FIG. 4, the interface control portion 23 for controlling the interface unit is connected to the entire control portion 21B in the main control portion 21. The entire control portion 21B outputs a sheet by means of the printer 3 by receiving an input from the interface unit, an input from the operating portion 4 or an output instruction from LAN.

In the examples shown in FIGS. 1, 5, and 6, the control portion and the control object unit are disposed in the vicinity of each other because the control portion is accommodated in the base unit which supports each module in each case. Particularly, in the image forming apparatus shown in FIG. 1, the accommodating portion 11B of the base unit 10B is empty as shown in FIG. 3. However, when any module is added to the image forming apparatus shown in FIG. 1, the control portion of the added module can be accommodated in the accommodating portion 11B of the base unit 10B. The reader 2 in an example as shown in FIG. 8 is an automatic original reader which reads an image on an original by automatic feeding and an interface unit composed of the touch panel 5, card reader 6, and/or radio IC card reader 7 are added to the top of this reader 2. In this case, the quantity of the control object modules increases, so that a new control portion for controlling this control object module is required. As shown in FIG. 9, each control portion and a control object module controlled by each control portion are accommodated in each base unit such that they are disposed in the vicinity of each other. That is, the interface control portion 23 of the interface unit (touch panel 5, card reader 6, and radio IC card reader 7) is accommodated in the base unit 10A. The main control portion 21 which integrates the reader control portion 21A for controlling the reader 2 and the entire control portion 21B is accommodated in the base unit 10B and the print control portion 22 for controlling the printer 3 is accommodated in the base unit 10C. By disposing the control portion and the control object module in the vicinity of each other, communication path which connects the control portion with the control object module becomes unlikely to be affected by noise. While the base unit which constitutes the supporting body 10 is used as a mere structure component as exemplified in FIG. 4, it can be used as space for accommodating the control portion when other function is added. Thus, the present embodiment can meet customer needs flexibly.

FIG. 10 is a block diagram showing the control structure of the image forming apparatus shown in FIG. 8. As compared with the control structure shown in FIG. 7, the automatic original reader 2 is connected to the reader control portion 21A in the main control portion 21 while connection of the operating portion to the main control portion 21 is omitted.

According to the present embodiment, as described above, the quantity and combination of the base units can be changed freely depending on the quantity and size of the modules to be mounted. As a consequence, the variation of the apparatus configuration can be increased thereby meeting customer needs delicately.

Further, the accommodation space of the control portion for controlling the module can be secured without excess or shortage even if the quantity of the modules which constitute the apparatus is increased or decreased.

By disposing the control portion and the control object module in the vicinity of each other, communication path for connecting the control portion with the control object module becomes unlikely to be affected by noise.

The quantity and structure of the modules described in the present embodiment and the quantity and combination of the base units which constitutes the supporting body are just an example and may be changed appropriately depending on the structure of the apparatus to which the present invention is applied and a variety of conditions and the scope of the present invention is not restricted to those components.

In any embodiment, the quantity and combination of the base units can be changed freely depending on the quantity and size of the modules to be mounted because the supporting means which supports a plurality of the modules is constituted by joining a plurality of the base units. As a consequence, the variation of the apparatus structure can be increased thereby meeting customer needs delicately.

Further, because each of the respective base units which constitute the supporting means has an accommodating portion for accommodating the control means, the accommodation space for the control means which controls the modules can be secured without excess or shortage even if the quantity of the modules which constitute the apparatus is increased or decreased.

This application claims the benefit of priority from the prior Japanese Patent Application No. 2005-263265 filed on Sep. 12, 2005 the entire contents of which are incorporated by reference herein.

What is claimed is:

1. An image forming apparatus including first and second modules, said apparatus comprising:
a plurality of base units through which the first module and the second module are connectable to each other, said plurality of base units being capable of being joined to each other and disconnected from each other;
a first control portion which controls the first module; and
a second control portion which controls the second module,
wherein one of said plurality of base units, which is in a vicinity of the first module, contains said first control portion, and a different one of said plurality of base units, which is in a vicinity of the second module, contains said second control portion.

2. The image forming apparatus according to claim 1, wherein the base unit containing said first control portion is connected to the first module to support the first module, and the base unit containing said second control portion is connected to the second module to support the second module.

3. The image forming apparatus according to claim 1 further comprising a plurality of joining units for joining a pair of each of said plurality of base units to each other,
wherein one of said plurality of joining units connects the base unit containing said first control portion with the base unit containing said second control portion such that said first control portion and said second control portion are capable of communicating with each other.

4. The image forming apparatus according to claim 1, wherein the first module is a reading unit which reads an image on an original sheet and the second module is a printing unit which prints an image on a sheet.

5. The image forming apparatus according to claim 4, wherein said plurality of base units are arranged so that the first module is above the second module and said plurality of base units are arranged so that there is a space between a bottom of the first module and a top of the second module.

6. The image forming apparatus according to claim 1, wherein each of said plurality of base units has a substantially similar structure.

7. The image forming apparatus according to claim 1, wherein the base unit containing said first control portion extends vertically and supports the first module, the base unit containing said second control portion extends vertically and supports the second module, and one of said plurality of base units is an intermediary base unit which extends vertically,
wherein an upper end portion of the intermediary base unit is joined to a lower end portion of the base unit containing said first control portion, and a lower end portion of the intermediary base unit is joined to an upper end portion of the base unit containing said second control portion, and
wherein the intermediary base unit and the base unit containing said first control portion are disconnectable from each other, and the intermediary base unit and the base unit containing said second control portion are disconnectable from each other.

8. The image forming apparatus according to claim 7, wherein the base unit containing said first control portion, the intermediary base unit, and the base unit containing said second control portion have substantially similar structure.

9. The image forming apparatus according to claim 7, wherein the intermediary base unit secures a space between a bottom of the first module and a top of the second module.

* * * * *